United States Patent [19]

Lazare et al.

[11] Patent Number: 5,049,005
[45] Date of Patent: Sep. 17, 1991

[54] DEVICE FOR THE ASSEMBLY OR MECHANICAL REINFORCEMENT AND THE ANTI-CORROSION TREATMENT OF ELEMENTS OF IMMERSED STRUCTURES, AND ASSEMBLY AND TREATMENT PROCESS RELATING THERETO

[75] Inventors: Francois Lazare; Roger Genet, both of Le Lignon, Switzerland

[73] Assignee: Irete S.A., Le Lignon, Switzerland

[21] Appl. No.: 550,229

[22] Filed: Jul. 9, 1990

Related U.S. Application Data

[63] Continuation-in-part of Ser. No. 243,560, Jul. 29, 1988, abandoned.

[30] Foreign Application Priority Data

Dec. 2, 1986 [CH] Switzerland .......................... 4798/86

[51] Int. Cl.$^5$ .......................... E02D 5/60; E02D 31/06
[52] U.S. Cl. .................................... 405/216; 405/211; 403/191; 403/385; 403/403
[58] Field of Search ................ 405/211, 216; 403/191, 403/205, 385, 403

[56] References Cited

U.S. PATENT DOCUMENTS

| | | | |
|---|---|---|---|
| 3,107,495 | 1/1963 | Plodowski | 405/225 |
| 3,992,272 | 1/1976 | Maxson et al. | 405/216 X |
| 4,300,852 | 11/1981 | Clark | 403/385 |

FOREIGN PATENT DOCUMENTS

| | | | |
|---|---|---|---|
| 2657396 | 12/1976 | Fed. Rep. of Germany . | |
| 2426851 | 5/1979 | France . | |
| 2163468 | 2/1986 | United Kingdom | 405/216 |

Primary Examiner—David H. Corbin
Assistant Examiner—Arlen L. Olsen
Attorney, Agent, or Firm—Pennie & Edmonds

[57] ABSTRACT

A device and process for reinforcing underwater structures of branched joints having a main element (1) and at least one secondary element (2), one end to which is integral with the surface of element (1). The device incorporates a flange (3, 3'), a first portion (3') of which is initially fixed to the secondary element (2), and a second portion (3') of which is thereafter fixed to the first portion. The flange portions define an annular space between the flange and the elements. A liquid composition which generates an elastic polymerized material (4) is introduced into an enclosure to fill the annular space and encapsulate the flange, which enclosure defines the outer boundary of the polymerized material (4).

29 Claims, 2 Drawing Sheets

DEVICE FOR THE ASSEMBLY OR MECHANICAL REINFORCEMENT AND THE ANTI-CORROSION TREATMENT OF ELEMENTS OF IMMERSED STRUCTURES, AND ASSEMBLY AND TREATMENT PROCESS RELATING THERETO

This is a continuation-in-part of application Ser. No. 07/243,560, filed July 29, 1988, now abandoned.

TECHNICAL FIELD

The invention relates to a device for the rigid assembly or mechanical reinforcement of elements forming part of immersed structures, such as the branch joints which exist, for example, on offshore drilling platforms. The invention further relates to a process for the rigid assembly or mechanical reinforcement and the anticorrosion treatment of such structural elements, and to a device for carrying out the said process.

BACKGROUND ART

All immersed structures, for example bridge pillars, dikes, dams or offshore drilling platforms, are subject to the effects of corrosion in the longer or shorter term. Such effects tell in particular on all the metal parts immersed in a marine environment and, depending on the extent of the corrosion, they often result in mechanical weakening of the entire structure. The strength and lifetime of the structure are accordingly reduced.

The anticorrosion treatments which have been carried out hitherto use quasi-manual techniques. The most widely practiced solution in fact consists in utilizing the services of divers, who, under several meters or tens of meters of water, manually coat the elements to be treated with, for example, paints, resins or mastics. Such techniques, practiced under difficult conditions, are very expensive, hazardous for the workforce and, most frequently, rather unsatisfactory in terms of their effectiveness.

In addition to the adverse effects due to corrosion, immersed structures of this kind suffer the consequences of various mechanical stresses such as, for example, gravity, the repeated impact of the waves, the pressure of underwater currents or the traction on anchorage points. Offshore drilling platforms are relatively sensitive structures in this respect, by virtue of both their construction and their exposure to the natural elements. Under the effect of the swell over a prolonged period, constituent elements such as branch joints are continually subjected to forces of traction, compression or even shear or torsion. Since they generally contain a large number of welds, these branch joints constitute weak points which should be checked regularly, protected or even reinforced if necessary, these operations being difficult, if not dangerous, at very great depths.

Although simulations on mock-ups or with the aid of theoretical models are possible and enable the weakest points of such structures to be identified beforehand if necessary, the number and variety of the effects to which branch joints of immersed drilling platforms may be subject are such that, in practice, one has to make do with taking action a posteriori, i.e. when the structure is already in service, after a more or less prolonged period of immersion.

To carry out the rigid assembly or mechanical reinforcement and the anticorrosion treatment of elements forming part of immersed structures, such as branch joints, for example, it is essential for those skilled in the art to have at their disposal technical solutions which are easily applicable, non-hazardous and reliable. This is advantageously achieved by using the device and following the installation procedure set forth herein.

SUMMARY OF THE INVENTION

It has in fact been discovered that the device according to the invention can advantageously be used for the rigid assembly or mechanical reinforcement and the anticorrosion treatment of elements forming part of highly complex structures, such as branch joints of members—girders or tubes—supporting offshore drilling platforms, for example.

It has been observed in particular that such elements assembled with the aid of the device according to the invention are capable of withstanding traction or compression forces which are considerably greater than, or in some cases more than twice as great as, those withstood by assemblies constructed using the common techniques, before they suffer deformation or their welds break.

BRIEF DESCRIPTION OF THE DRAWINGS

The attached Figures illustrate, by way of example, one of the embodiments of the device according to the invention.

DETAILED DESCRIPTION OF THE PREFERRED EMBODIMENTS

In the embodiment shown in the Figures mentioned above, the device according to the invention is designed for the rigid assembly or mechanical reinforcement and the anticorrosion treatment of a branch joint made up of a main tubular element 1 and a secondary tubular element 2, one of the ends of which is integral with the surface of the said element 1. This type of embodiment in no way implies a limitation.

Figure 1:
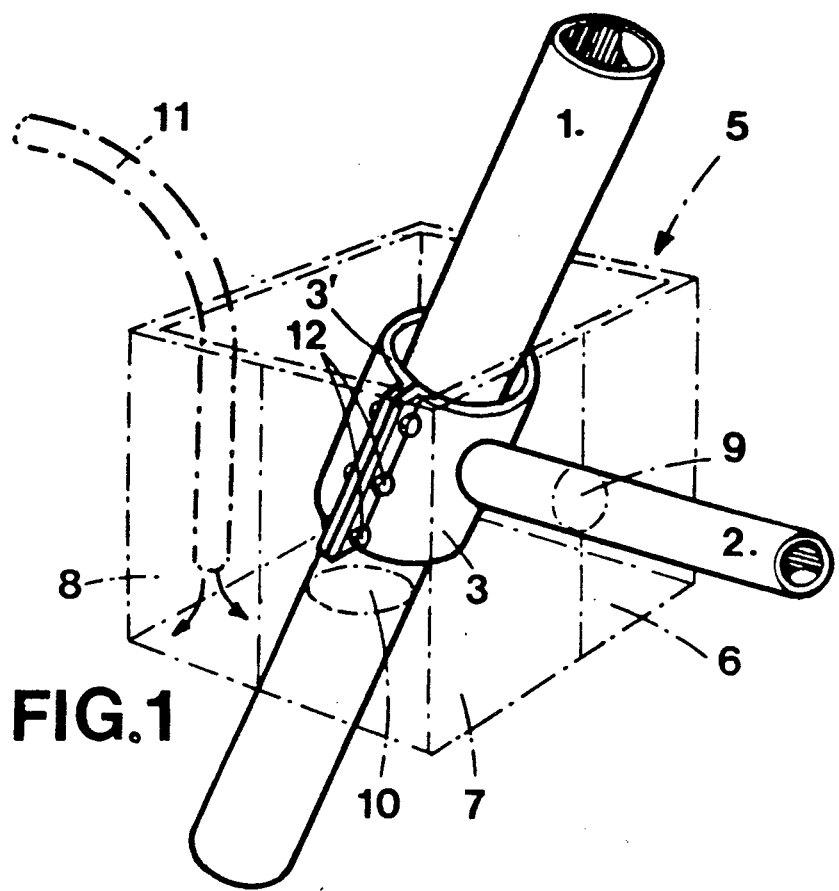
FIG. 1 shows part of one of the embodiments of the device according to the invention and one embodiment of the device for carrying out the process of the invention.
Figure 2:
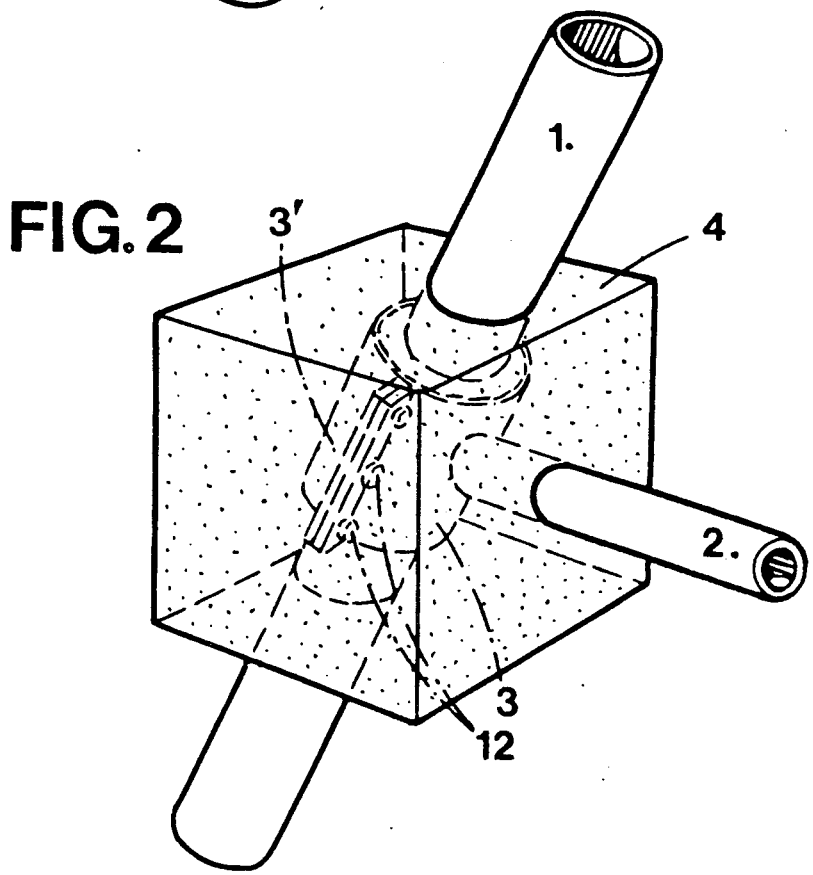
FIG. 2 shows one of the embodiments of the device according to the invention.
Figure 3:
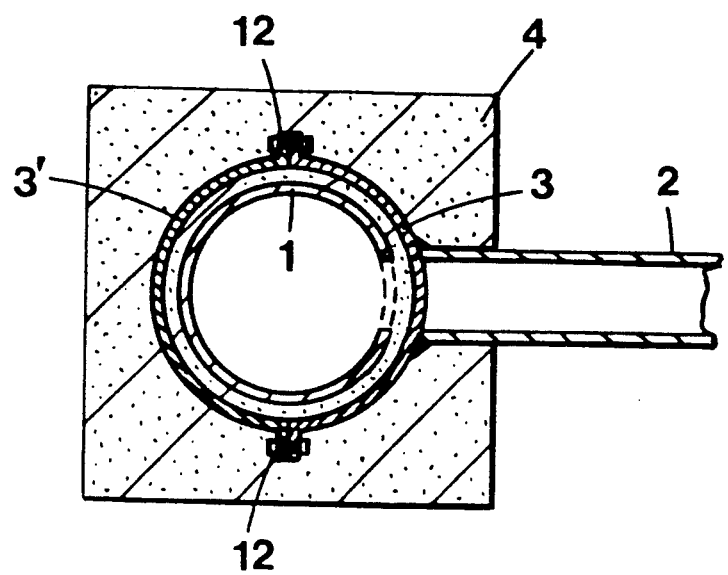
FIG. 3 is a view in section of one particular embodiment of the device according to the invention.
Figure 4:
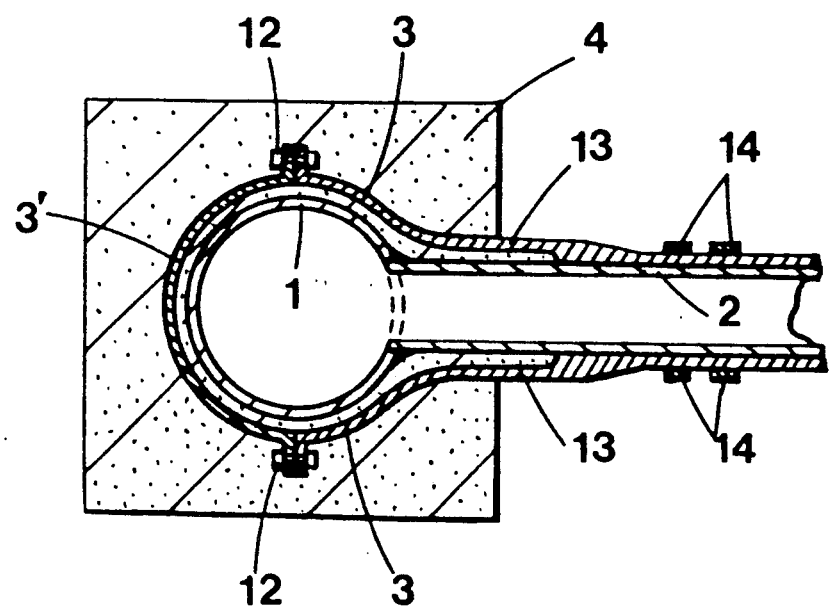
FIG. 4 is a view in section of another particular embodiment of the device according to the invention.

According to the invention, the device comprises a flange 3, 3' fixed to the secondary element 2, either to its sides (FIG. 4) or to its end (FIGS. 1 to 3). The said flange is made up of a first portion 3 which is integral with the element 2 and shaped so as to surround at least part of the main element 1, and at least one second portion 3'—if necessary several flange segments 3' cooperating with one another which is shaped so that it can be fixed to the first portion 3 in order to form, with the latter, a flange 3, 3' surrounding the element 1 with a certain amount of play. The portions 3 and 3' can be fixed to one another by any appropriate means 12 such as, for example, bolts, rivets or spot welds.

When the flange portion 3 is fixed to the end of the element 2 (FIG. 3), the fixing is effected in most cases by means of a weld. When the flange portion 3 is fixed to the sides of the element 2 (FIG. 4), the said portion can, for example, extend into a shape 13 enveloping the said element 2 over part of its outer surface; in such a case, the fixing can be effected by means of clamping collars 14.

According to the invention, the flange 3, 3' is shaped so as to surround the main element 1 with a certain amount of play. This play is actually necessary to permit the insertion of elastic polymerized material 4, which, once in contact with all the metal surfaces to be treated, can thus fully exert its corrosion-inhibiting effect. The mass 4 should also be uniformly distributed on either side of the flange 3, 3' in order to ensure a good distribution of the mechanical stresses to which the unit is subject. The play created between the outer surface of the element 1 and the inner surface of the flange 3, 3' can vary, from case to case, from several millimeters to several centimeters; it will most commonly be of the order of the thickness of the metal plates used to construct the elements 1 and 2 and the flange 3, 3'.

As indicated, the portions of the elements 1 and 2 which cooperate with the flange 3, 3' are set in a mass of elastic polymerized material 4 (FIG. 2). According to the invention, this is a homogeneous mass whose coefficient of elasticity can be adjusted at will in accordance with the mechanical stresses to be withstood. It is up to those skilled in the art to make such an adjustment: an attempt will be made in particular to avoid thereby introducing hard points into the immersed structure as a whole.

In order to carry out the fixed assembly or mechanical reinforcement and the anticorrosion treatment of elements such as those described above, the following operations are performed under water, the situation supposedly being one in which the weld initially joining the element 2 to the surface of the element 1 has given way and the end portion of the element 2 has been sawn or abraded (FIG. 3):

A first flange portion 3 is fixed to the sawn or abraded end of the element 2, most commonly by means of a weld, the portion 3 being shaped so as to surround at least part of the element 1. This operation can be repeated several times if the branch joint has several secondary branches.

A second flange portion 3' is then fixed to the first portion 3 using appropriate means 12. If necessitated by the configuration of the point to be treated, it is possible to assemble several flange portions 3', cooperating with one another, and to fix them to the first portion 3 to give the desired flange 3, 3'. The shape and arrangement of all the elements making up the flange 3, 3' are of course designed so that the flange surrounds the element 1 with the predefined play.

Finally, a liquid composition generating an elastic polymerized material 4 is poured into an enclosure 5 surrounding the unit formed by the flange 3, 3' and the portions of the elements 1 and 2 which cooperate therewith.

In a situation where the device according to the invention is more particularly intended for the mechanical reinforcement and the anticorrosion protection of branch joints in which the secondary element 2 remains welded to the main element 1, it is possible, for example, to adopt the following procedure (see Figure 4):

For such purposes, a first flange portion 3, or, if necessary, several first portions are used which extend into the shape of an envelope 13. This extension 13 is shaped so that it can be laid against the sides of the element 2, on its outer surface, in the vicinity of the end welded to the element 1.

The said flange portion 3 is fixed to the element 2 by way of its extension 13, the rigidity of this unit being provided by, for example, clamping collars 14.

A second flange portion 3' is then fixed to the first portion 3, the flange formed being shaped so as to surround the element 1 with the desired play.

Finally, the liquid composition generating elastic polymerized material 4 is poured in, as indicated above.

According to the invention, the said liquid composition has a greater density than the surrounding liquid medium. Using appropriate means, which will be described below, it is brought to the lower zone of the space inside the enclosure 5, the said space then being progressively filled from the bottom and the liquid composition driving the water upwards out of the said space as it enters. This procedure avoids undesired mixing of the liquids present, which can lead to the formation of emulsions and in some cases to homogeneity defects in the mass 4 once it has polymerized.

As indicated previously, the liquid composition generating elastic polymerized material has a greater density than the surrounding liquid medium. The density is adjusted in conventional manner using commercial products. The said liquid composition also has the characteristic of polymerizing without shrinking, under the conditions of the surrounding medium: it is this quality which makes it possible to guarantee a good adhesion of the polymer to the element treated, for example metal or concrete, and consequently optimum anticorrosion protection and mechanical reinforcement. Moreover, the liquid composition is designed so as to generate an elastic polymerized mass and preferably a polymerized mass whose modulus of elasticity can be adjusted at will in accordance with the desired effects of mechanical reinforcement.

Liquid compositions which can advantageously be used are two-component mixtures generating epoxy resins or polyurethanes, these being mixed, if necessary, with various additives such as, for example, ballasting substances, polymerization retarders or colorants. The essential requirement is to obtain a liquid composition which polymerizes under water and whose characteristics can be adapted at any time to suit the needs described above: those skilled in the art can easily achieve this using specialized commercial products.

The enclosure 5 mentioned above also forms part of the invention: it is utilized as a means of carrying out the above process. The invention relates more precisely to a device comprising preformed sections of shuttering, 6, 7, 8 etc. which can be joined together, around the point to be treated, to form an enclosure 5 which is open at the top and, on some of its faces, has passages 9, 10 etc. which fit closely around the periphery of the elements 1 and 2 cooperating with the said faces, and comprising means 11 for bringing the liquid composition to the lower zone of the space defined by the said enclosure The detail of a particular embodiment of such a device (see FIG. 1) and its use according to the invention will be described below. Over at least part of its edges, each of the sections of shuttering 6, 7, 8 etc. has one or more recesses located so as to coincide with one or more corresponding recesses in the adjacent section of shuttering, thus forming passages 9, 10 etc. whose axis of symmetry is most commonly represented by the edge shared by two assembled sections. The said passages 9, 10 etc. are shaped so as to fit closely around the periphery of the elements 1 and 2 of the immersed structure. This type of preforming does not present any particular problems because it can be prepared very accurately on land using the construction drawings of the structure to be treated.

As the case may be, the periphery of the passages 9, 10 etc. can be provided with elastic gaskets, one of the purposes of which is to compensate for the imperfections in the construction or preforming. Such gaskets can also be provided on the edges along which the sections of shuttering have to cooperate.

The device also comprises means which enable the assembled sections of shuttering 6, 7, 8 etc. to be fixed together. Any appropriate known means, for example a latch, a clip or a screw or bolt system, can be used for such purposes. The said means will be designed so as to ensure either temporary or permanent assembly of the sections of shuttering, as the case may be.

The device also comprises means 11 which enable a polymerizable liquid composition to be brought to the lower zone of the space defined by the enclosure 5. An example of a means 11 which can be used is an injection pump connected to a pipe whose lower end comes out near the bottom of the enclosure 5, inside the latter. The simplest solution consists in using a flexible tube of adequate diameter, which brings the liquid composition from the surface.

The device is positioned in the following manner. Firstly, rigid preformed sections of shuttering 6, 7, 8 etc. are brought to the level of a point on the structure which is to be treated, and they are then assembled, at least in pairs, by their edges to form an enclosure 5 around the point to be treated, the said enclosure being open at the top and some of its faces allowing elements 1 and 2 of the structure to pass through the passages 9, 10 etc. Once the said sections have been fixed together and the unit has thus been rendered rigid around the point on the structure which is to be treated, the space defined by the enclosure 5 is filled with a liquid composition which polymerizes without shrinking.

As the case may be, to enable the sections of shuttering to be removed easily from the polymerized mass 4, the inner face of the said sections can be lined beforehand with a sheet or film of polymer exhibiting weak adhesion towards the mass 4, for example a sheet of polyester.

Also, as the case may be, the sections of shuttering 6, 7, 8 etc. can be reinforced with angles or ties arranged according to the mechanical stresses to be suffered. To make them easier to handle in a liquid medium, the said sections will preferably be made of a material whose density is substantially similar to that of the surrounding liquid medium: it is possible to use simple or composite materials such as high-density wood or polyester reinforced with glass fibers, for example, suitably ballasted with metal elements if necessary.

As the case may be, the sections of shuttering used can also be made of steel, the said sections then being kept suspended with the aid of floats or, where possible, held up by cables or any other appropriate means at the surface. In cases where immersed metal structures are treated, a so-called sandwich (metal/ polymer/metal) is obtained which also contributes to the mechanical reinforcement of the unit, the sections of shuttering used then being left in place.

What is claimed is:

1. A device for the rigid assembly or mechanical reinforcement and the anticorrosion protection of branch girder joints forming part of immersed structures, said branch joints made up of a main girder element (1) and at least one secondary girder element (2), said device comprising a rigid flange (3,3') fixed directly and rigidly to at least one of the secondary elements (2), said flange being shaped so as to surround the main element (1) with a space therebetween, and a mass of electric polymerized material (4) filling said space and encapsulating the flange (3, 3') and portions of the elements (1) and (2) which cooperate with said flange.

2. The device of claim 1 wherein a first portion (3) of said flange is attached to an end portion of said secondary element (2) and is shaped to surround a portion of said surface of element (1) at said joint with element (2).

3. The device of claim 1 wherein a first portion (3) of said flange is welded to an end of said secondary element (2) and is shaped to surround a portion of said surface of element (1) at said joint with element (2).

4. The device for the assembly or reinforcement and protection of branch joints according to claim 1 wherein the secondary element (2) has an end adjacent the main element and wherein said flange (3, 3') is fixed to said end of the secondary element.

5. The device according to claim 1 wherein the main and secondary elements (1, 2) have a predetermined wall thickness and said space has a thickness on the order of the thickness of said elements.

6. A process for the rigid assembly or mechanical reinforcement and the anticorrosion treatment of branch girder joints forming part of immersed structures, said branch joints made up of a main girder element (1) and at least one secondary girder element (2), said process comprising:
   directly and rigidly fixing, in a final position, a first rigid flange portion (3) to the secondary element (2), said first flange portion being shaped so as to surround at least part of the main element (1);
   directly and rigidly fixing to the first flange portion (3) at least one second rigid flange portion (3') shaped to cooperate with said first portion (3) to form, in a final position, a flange (3, 3') surrounding the main element (1) with a space therebetween; and
   thereafter pouring a liquid composition into an enclosure (5) surrounding a unit formed by the flange (3, 3'), the space and portions of the elements (1) and (2) which cooperate therewith for generating a body of elastic polymerized material (4) surrounding said unit and filling said space.

7. The process according to claim 6, which further comprises selecting the liquid composition to have a greater density than the surrounding liquid medium.

8. The process according to claim 6, which further comprises selecting composition from one which polymerizes without shrinking and which enables the modules of elasticity of the polymerized material (4) to be adjusted at will.

9. A device for carrying out the process according to claim 6, comprising preformed sections of shuttering (6, 7, 8 etc.) which can be joined together, around the parts to be treated including said flange (3, 3') to form an enclosure (5) which is open at the top and, on some of tis faces, has passages (9, 10 etc.) which fit closely around the periphery of the elements (1) and (2) cooperating with the said faces, and comprising means (11) for bringing the liquid composition to the lower zone of the space defined by the enclosure (5).

10. The process according to claim 6 wherein said first flange portion (3) is attached to an end portion of said secondary element (2) and is shaped to surround a portion of said surface of element (1) at said joint with element (2).

11. The process according to claim 6 which further comprises adjusting the formulation of the liquid composition prior to the pouring step of change the resulting modulus of elasticity of the polymerized material (4).

12. The process for assembly or reinforcement and treatment of branch joints according to claim 6 including the steps of intergrally connecting the secondary elements (2) of said branch joints with the main element (1) and wherein the step of fixing a first flange portion (3) comprises securing a first flange portion, having an enveloping shape (13) in enveloping relation around said end of the secondary element.

13. The process for assembly or reinforcement and treatment of branch joints according to claim 6 wherein the secondary elements (2) of said branch joints have an end adjacent to the main element (1) and wherein the step of fixing a first flange (3) portion comprises fixing a first flange portion to said end of the secondary element.

14. The process according to claim 6 wherein the main and secondary elements (1, 2) of the branch joints have a predetermined wall thickness and wherein the flange (3, 3') is formed to provide the annular space with a thickness on the order of the wall thickness of the elements.

15. A device for the rigid assembly of mechanical reinforcement and the anticorrosion protection of branch girder joints forming part of immersed structures, said branch joints made up of a main girder element (1) and at least one secondary girder element (2), said device comprising a flange having a first portion (3) directly and rigidly attached to said secondary girder element (2) at said branch joint with the main element (1), and at least one second portion (3') joined to said first flange portion and forming an annular space between said flange portions (3, 3') and said main element (1) at said branch joint with element (2); and a mass of elasticized polymerized material (4) filling said annular space and encapsulating said flange portions and portions of elements (1) and (2) which cooperate therewith.

16. The device of claim 15 wherein said first flange portion (3) is welded to an end of said secondary element (2).

17. The device according to claim 15 further comprising preformed sections of shuttering (6, 7, 8 etc.) which are joined together to form an enclosure (5) around said flange portions (3, 3') which enclosure is open at the top and, on some of its faces, has passage (9, 10 etc.) which fit closely around the periphery of elements (1) and (2).

18. A process for the rigid assembly or mechanical reinforcement and the anticorrosion treatment of branch girder joints forming part of immersed structures, said branch joints made of a main girder element (1) and at least one secondary girder element (2), which comprises
    directly and rigidly attaching, in a final position, a first rigid flange portion (3) to said secondary girder element (2), said flange portion being shaped so as to surround at least part of the main element (1);
    directly and rigidly fixing to the first flange portion (3) at least one second rigid flange portion (3') which is shaped so as to cooperate with the said first portion (3) to form, in a final position, a flange (3, 3') surrounding the main element (1) at said branch joint with element (2) and defining an annular space therebetween; and
    thereafter filling said annular space and surrounding said flange (3, 3') with a liquid composition which generates an elastic polymerized material (4) encapsulating said flange (3, 3') and portions of the elements (1) and (2) which cooperate therewith.

19. The process according to claim 18 which further comprises retaining said liquid composition within an enclosure until said elastic polymerized material (4) is generated.

20. The process according to claim 19 which further comprises forming said enclosure of preformed section of shuttering.

21. The process according to claim 19 which further comprises directing said liquid composition to a lower zone of the space defined by enclosure.

22. The process according to claim 18 which further comprises selecting the liquid composition to have a greater density than the surrounding liquid medium.

23. The process according to claim 18 which further comprises selecting the liquid composition from one which polymerizes without shrinking.

24. The process according to claim 18 which further comprises adjusting the formulation of the liquid composition prior to the pouring step to change the resulting modulus of elasticity of the polymerized material (4).

25. The process according to claim 18 wherein said first flange portion (3) is welded to an end of said secondary element (2).

26. A process for the rigid assembly or mechanical reinforcement and the corrosion treatment of branch girder joints of structures, said branch joints being made up of a main girder element (1) and at least one secondary girder element (2) lying along a line intersecting the main element, said element having predetermined wall thicknesses and said process comprising:
    directly and rigidly attaching, in a final position, a first flange portion (3) to a secondary element (2), said flange portion being shaped to surround at least part of the main element at the point of intersection of said line with the main element;
    directly and rigidly fixing to the first flange portion at least one additional flange portion (3') which is shaped to cooperate with the first portion (3) to form, in a final position, a flange (3, 3') surrounding the main element, and said flange (3, 3') defining an annular space around said main element (1), said annular space having a thickness on the order of the wall thickness of the elements (1, 2); and
    thereafter filling the annular space and surrounding the flange (3, 3') with a liquid which generates a body of elastic polymerized material encapsulating said flange (3, 3') and portions of the elements (1, 2) which cooperate therewith.

27. A mechanically reinforced and corrosion resistant branch girder joint for structures, comprising:
    a main girder element (1) with a wall thickness;
    a secondary girder element (2) with a wall thickness said secondary element lying along a line intersecting the main element;
    a first flange portion (3) secured directly and rigidly to the secondary element;
    at least one additional flange portion (3') secured directly and rigidly to the first flange portion to form a flange (3, 3') surrounding the main element (1) with an annular space therebetween at the point of intersection of said line with said main element; and a mass of elasticized polymer material (4) filling the annular space and surrounding the flange (3, 3') and portions of the elements (1, 2) associated therewith.

28. The branch joint according to claim 27 wherein the thickness of the annular space is on the order of the wall thickness of the elements (1, 2).

29. A device for the rigid assembly or mechanical reinforcement and the anticorrosion protection of branch joints forming part of immersed structures, said branch joints made up of a main element (1) and at least one secondary element (2) having an end integral with said main element, said device comprising a flange (3, 3') with an enveloping shape (13) secured around said end of at least one of the secondary elements (2), said flange being shaped so as to surround the main element (1) with an annular space therebetween, and a mass of elastic polymerized material (4) filling said annular space and encapsulating the flange (3, 3') and portions of the elements (1) and (2) which cooperate with said flange.

* * * * *